(12) United States Patent
Schinner et al.

(10) Patent No.: US 6,900,840 B1
(45) Date of Patent: May 31, 2005

(54) DIGITAL CAMERA AND METHOD OF USING SAME TO VIEW IMAGE IN LIVE VIEW MODE

(75) Inventors: Charles Schinner, San Diego, CA (US); Mark A. Van Veen, Cardiff by the Sea, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 09/661,764

(22) Filed: Sep. 14, 2000

(51) Int. Cl.[7] .................. H04N 5/222; H04N 5/225; H04N 5/235
(52) U.S. Cl. .................. 348/333.01; 348/229.1; 348/217.1
(58) Field of Search .................. 348/333.01–333.11, 348/222.1, 229.1, 241–248, 217.1

(56) References Cited

U.S. PATENT DOCUMENTS 5,398,065 A  3/1995 Okino .................. 348/371

6,603,508 B1 * 8/2003 Hata .................. 348/229.1

* cited by examiner

Primary Examiner—Wendy R. Garber
Assistant Examiner—Kelly L. Jerabek
(74) Attorney, Agent, or Firm—Jerry R. Potts (57) ABSTRACT

In accordance with the present invention, a new and improved digital camera has a capture mode of operation where a scene to be captured can be captured and stored in a removable memory device as a digital still image and subsequently retrieved and displayed on a LCD in a review mode of operation. Alternatively, the scene to be captured can be captured repeatedly and buffered to the LCD where the buffering rate is determined in a live view capture mode of operation allowing a user to preview the scene to be captured in various ambient lighting conditions. In one instance, under low ambient lighting conditions a user is able to manually adjust the live view/preview apparent image brightness level of tie displayed scene independently of any LCD brightness or contrast adjustments.

6 Claims, 6 Drawing Sheets

AUTO EXPOSURE

Auto Exposure Sequencing

FIG. 6

DIGITAL CAMERA AND METHOD OF USING SAME TO VIEW IMAGE IN LIVE VIEW MODE

RELATED APPLICATIONS

This application is related to U.S. patent application Ser. No. 09/661,883 entitled "Digital Method of Improving Image Quality in Live View Mode", filed on Sep. 14, 2000.

FIELD OF INVENTION

The present invention relates generally to cameras, and more particularly, to a digital camera having an adjustment feature for improving image quality in a live view mode of operation.

BACKGROUND OF THE INVENTION

In general, analog cameras must give feedback to a user of what area of a scene to be photographed will be captured when a picture is taken. This has traditionally been accomplished using a built-in device called an optical viewfinder or an optical window that enables the user to visualize the scene and see approximately what area of the scene that will be captured by the camera lens system.

In modern day digital cameras, the viewing of the scene that will be captured is accomplished with either an optical viewfinder or a liquid crystal display (LCD) unit in combination with an optical viewfinder. The LCD in this instance displays the scene on a viewing screen for preview by a user. The viewing of such a scene prior to the image being captured and stored on a removable memory device is called a preview or live view mode of operation. When the image has been captured and stored on such a removable memory device, the LCD unit may also be utilized to view the stored digital image in what is called a post view or review mode of operation where the captured image is retrieved from the removable memory device and displayed on the LCD.

In the live view mode of operation, the scene to be previewed is repeatedly captured by a charged coupled device (CCD) and then buffered to the LCD to allow the image to be refreshed at some predetermined refresh rate or frames per second rate without the benefit of any long term memory storage device. The purpose of this mode of operation is to provide the user with benefit of viewing the exact framing of the image prior to the image being captured. In such a mode of operation, as mentioned earlier, the image is captured at a predetermined frame rate of N frames per second. Thus, for this example, the image is captured at thirty frames per second. Since the camera is capturing the image at a predetermined frame rate, when the camera is repositioned, the image buffered previously disappears and a new image appears.

Based upon the limitations of the CCD and depending upon the brightness of the scene to be captured, the range of image capture times is limited to a fixed range of between $t_1$, seconds and $t_2$ seconds, where $t_1 >> t_2$. In short then, to maintain the N frames per second viewing rate, the image capture time may not fall below $t_2$ seconds without causing a substantial degradation in the quality of the buffered image.

In most, if not all digital cameras, the above-mentioned limitations are recognized and thus, such cameras are designed to provide a range of exposure times and aperture settings with a constant gain factor for boosting the signal from the CCD to provide an optimum image at a given brightness. While such an arrangement is generally acceptable for a point, shoot and capture image operation, where the image is captured and stored in a long term storage device, such an arrangement is not optimum for a live view mode of operation because of the wide variable lighting conditions that may be present to the camera as the user moves from an indoor setting to an outdoor setting, and from a bright sunny setting to a relative dark shadow setting. Thus, unlike the point and shoot mode for capturing a scene where a strobe or flash is a convenient way of adjusting for poor lighting conditions, in a buffered image mode or live view mode, a strobe or flash would not be a satisfactory solution.

Therefore it would be highly desirable to have a new and improved digital camera that could provide a user with the ability to correct for image degradation in a live view mode of operation resulting from variable low lighting conditions.

SUMMARY OF THE INVENTION

In accordance with the present invention, a new and improved digital camera has a capture mode of operation where a scene to be captured can be captured and stored in a removable memory device as a digital still image and subsequently retrieved and displayed on a LCD in a review mode of operation. Alternatively, the scene to be captured can be captured repeatedly and buffered to the LCD where the buffering rate is determined in a live view capture mode of operation allowing a user to preview the scene to be captured in a wider range of ambient lighting conditions. In one instance, under low ambient lighting conditions a user is able to manually adjust and increase the apparent image brightness level of the displayed scene independently of any LCD back light level or contrast adjustments.

BRIEF DESCRIPTION OF DRAWINGS

The above-mentioned features of the present invention and the manner of attaining them will become apparent and the invention itself will be best understood by reference to the following description of the preferred embodiment of the invention, in conjunction with the accompanying drawings, wherein.

BEST MODE FOR CARRYING OUT THE INVENTION

Before discussing the present invention it may be appropriate to review some of the problems associated with prior art digital cameras. Cameras are portable products that users can take to various locations to capture images of interest. With this portability and user range of interest, the cameras must account for variable lighting conditions. Film cameras accomplish this by having an adjustable lens aperture and shutter speed to capture images of proper exposure. This combination of shutter speed and aperture has a limited range of light capture. The user can select different sensitivity films that can extend the range of image capture of the camera under low light conditions, in addition to using a built-in strobe as a light supplement.

With a digital camera, both aperture and shutter speed controls are included with the camera. However, the third parameter for the user to capture images under various lighting conditions is removed since the CCD has a fixed sensitivity setting. Just like film cameras, digital cameras have defined a range of apertures and shutter speeds available to capture images. When the image light level drops below this defined range, the image will be underexposed which will appear dark to the user in the final image. The conventional solution for low lighting conditions is the use of a flash or a strobe, however, such a solution would not be satisfactory for a buffered live view mode of operation since the light produced by such a strobe is not continuous.

Digital cameras typically have different modes of operation. These are capture, review and connect modes of operation. The capture mode is where the user aims the camera at a scene to be recorded and the camera in response to the user actuating the shutter, captures an image of the scene. The image is then processed and stored on a removable memory device.

There are two methods for the user to frame the image to be captured. These are using an optical viewfinder and a through the lens viewing of the image on a liquid crystal display unit (LCD). Viewing through the lens with a LCD presentation of the image is commonly called a preview or live view mode of operation. In this live view mode, image data is captured from the CCD, processed and displayed on the image LCD. This allows the user to see what the camera will capture when the shutter button is actuated.

Since the camera is portable, it may experience a variety of lighting conditions. The user can activate or start the live view/preview mode at any time while in the capture mode. With these two factors combined, the live view/preview mode should be able to display an image under a wide range of scene lighting conditions. The aperture setting and the electronic shutter speed or exposure time of the CCD controls the amount of light that can be converted by the CCD during a given period of time. Both of these variables, aperture setting and exposure time of the CCD can be adjusted over certain fixed ranges. For example, the aperture range in f-stops can be adjusted between about 2.8 to about 9.8, while the exposure time range of the CCD can be adjusted between about 2 seconds and about $1/750$ of a second. When the light level of a scene is dark and the aperture setting and exposure time of the CCD are set to maximum setting for capturing and converting light, but yet relative to the amount of available light entering the camera, a dark image results in the live view/preview mode since an insufficient amount of light is delivered to the CCD Another effect under low light conditions in the live view/preview mode is that the exposure time for the CCD increases up to the maximum value to capture as much light as possible. However, in an exposure range below about $1/30^{th}$ of a second, the user will experience smearing of the displayed image when moving the camera searching for an optimum framing. As this CCD exposure time increases, so does the smearing seen by the user in the displayed image. This is annoying to the user as it is hard to see what is being framed when moving the camera relative to a subject.

One proposed solution for solving the above mentioned image degradation problems is to increase the sensitivity of the CCD. Such a solution however, would be technologically difficult and would greatly increase the cost of an improved camera due to the necessity of recovering the R&D cost associated with developing such an improved CCD.

Another proposed solution would be to increase the aperture size of the lens to allow more light to fall upon the CCD. Although this solution could possibly solve the problem, increasing the size of the aperture of the lens would be relatively expensive and would thus, make the camera cost prohibitive to most users.

Therefore, there is a need for a new and improved digital camera that provides a user with the ability to correct for image degradation in a live view mode of operation resulting from variable lighting conditions. Such a new and improved camera should be relatively inexpensive and easy to operate under the variable lighting conditions.

Figure 1:
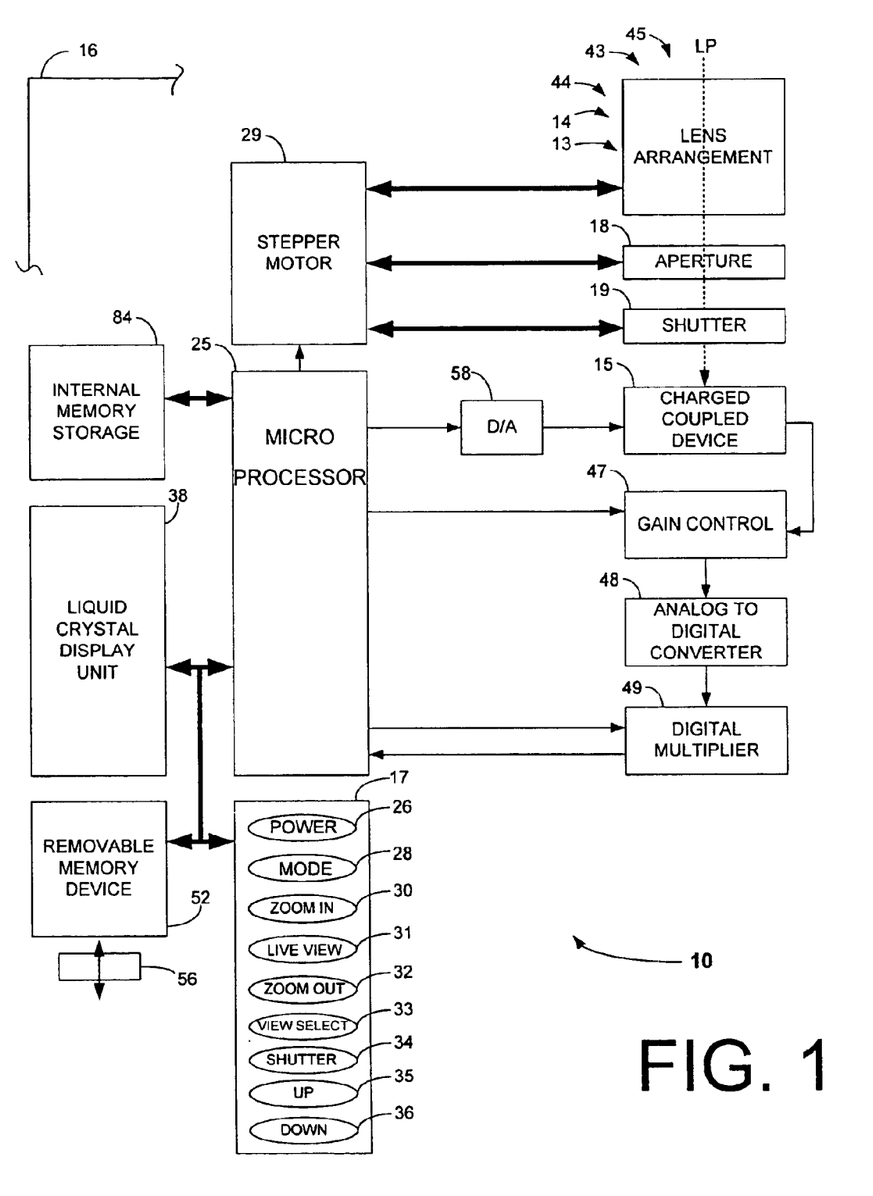
FIG. 1 is a block diagrammatic representation of a digital camera that is constructed in accordance with the preferred embodiment of the present invention.

Referring now to the drawings and more particularly to FIG. 1, there is illustrated a digital camera 10, which is constructed in accordance with the present invention. The digital camera 10 operates in three modes of operation: 1) a capture mode of operation where either in a capture still image operation, a framed image with the use of an optical viewfinder is captured and stored or in a live view operation, live action images are viewed without storing the images for immediate viewing until the user presses the shutter button, 2) a review mode where stored Images are retrieved and displayed for review by the user; and 3) a connect mode of operation where the camera may be coupled to a personal computer, stand alone printer, or other type of communication device that accepts image data for storage or printing purposes.

In accordance with the present invention, in the live view mode of operation, a user is able to adjust the viewability of the captured image by causing the strength of an analog or digital signal indicative of the displayed image to be increased or decreased depending upon ambient lighting conditions and user input as will be explained hereinafter in greater detail.

Considering the camera 10 in greater detail with reference to FIG. 1, the camera 10, generally includes a housing 16 having mounted therein an aperture/lens system or arrangement 13 that facilitates zooming, aperture adjustments and image focusing for image reproduction purposes. In this regard, the aperture/lens arrangement 13 generally includes a primary lens system indicated generally at 14 for focusing and optical zooming in and out of a scene to be captured, a shutter 19 for allowing the light indicative of the object to be captured to enter the photosensitive plane of the camera and an aperture 18 that is adjusted for receiving the proper amount of light to assure proper image formation.

In order to allow the user to interact with the camera electronics, the camera 10 includes a switch control panel 17 mounted within the housing 16 and includes a group of switches that help facilitate camera operation. In this regard, the control panel 17 includes a power on/off switch 26, a mode selection switch 28, a zoom in switch 30, a zoom out switch 32, a view select switch 33, and a shutter actuation switch 34. The function of each of the switches mentioned-above will be described hereinafter in greater detail. It should suffice however, to mention that the mode selection switch 28 permits the user to select a desired one of the different modes of operation mentioned earlier; e.g., the connect mode, the capture mode, and the review mode.

In order to allow the user to preview the scene to be captured, the camera 10 also includes a microprocessor 25, a internal memory storage unit 84 for control camera operations, a stepper motor 29 responsive to the microprocessor for controlling lens, aperture and shutter operations, a removable memory device 52 for receiving a flash memory card 56 to store captured digital images and a liquid crystal display (LCD) unit 38 for displaying images and messages. The microprocessor 25 is coupled electrically to a charged coupled device or CCD 15 that converts light to an electrical signal. In this regard, the CCD 15 is disposed in a primary light path LP for converting light to an electrical signal that is ultimately processed by the microprocessor 25 As best seen in FIG. 1, the primary light path extends through the primary lens system 14, the aperture 18 and the shutter 19 to the charged couple device 15.

The camera 10 also includes a zoom effect viewfinder arrangement 43 having a secondary lens system 44 and viewfinder 45. The viewfinder arrangement 43 operates in cooperation with a viewfinder zoom control algorithm, to provide the user with, an optical preview mode of operation where the user is able to see a visualization of the object scene that will be captured. In this mode of operation, the user is able to visualize the object scene with no power applied to the LCD unit 38 to affect a significant increase in the operating period of the camera. In short then, in the viewfinder preview mode of operation, the LCD unit 38 does not exert a power drain on the electrical system of the camera 10 as the LCD unit 38 is not placed in a power on condition. The live view mode selection switch 31 allows the user to switch the operating mode of the camera 10 between the two different viewing modes of operation, a viewfinder only mode and a LCD mode when in either the capture mode or the review mode of operation. In order to facilitate zoom-in and zoom-out commands, the camera 10 also includes a zoom in switch 30 and a zoom out switch 32 as best seen in FIG. 1.

Considering the digital camera 10 in greater detail, in order to improve the live view/preview performance of the camera 10, the camera 10 further includes a gain control circuit 47 and a digital multiplier 49. The gain control circuit 47 amplifies the analog signal coming from the CCD 15, while the digital multiplier 49 multiplies the digital value derived from the output signal from the analog to digital converter 48.

It should be understood by those skilled in the art that amplifying the output signal from the charged coupled device 15, whether analog or digitally boosts the image signal gain.

It should further be understood by those skilled in the art, that the analog gain value is typically optimized for the stored picture image quality is not optimized for live view/preview performance. The analog gain value in the capture still image operation is set to a preset constant fixed value. Conversely, when the camera is operated in the capture live view operation, adjusting the gain (analog or digitally) enables improved live view performance; thus, improving the ease of the user framing the scene.

The downside of such amplification is that noise in the image is also amplified. Therefore, under low light conditions, the signal of the CCD and the noise can be a higher percentage. This results in reduced image quality to the user. However, the user can see what is being framed better than without this technique.

The analog gain is implemented in the gain control circuit 47 which is a programmable amplifier disposed between the output of the charged coupled device 15 and input to the A/D converter 48. A digital equivalent is a multiplier 49 on the output of the A/D converter 48 or an internal multiplying operation performed by the microprocessor 25.

It should be noted that in a live view buffered capture mode of operation image quality is a second priority to displaying a viewable image and thus, in the live view mode, noise in the displayed image is acceptable. With this in mind, the programmable amplifier 47 boosts the analog/digital gain during live view only and the microprocessor 25 return the analog/digital gain to a preset constant value when an image signal is captured and stored for later retrieval. The programmable amplifier 47, which acts as the analog gain increase for the live view mode has a range of between about $G_{min}$ at −3.3 dB and about $G_{max}$ at 34.78 dB. The current default capture mode value for the programmable amplifier 47 is fixed at a predetermined dB level at the time of camera manufacture, for example the programmable amplifier is set for example at $G_{min}$ of about 11.36 dB.

Considering now the operation of the camera 10 in greater detail, the idea is to increase the gain of the image signal when both the aperture 18 is at the maximum aperture setting (maximum light impinging on the CCD) and exposure time for the CCD 15 is below 1/75th of a second. At this point the CCD 15 is not sensitive enough to capture a meaning image. This is the point where the LCD 38 would not be able to display a viewable image. When in this condition, the user can manually adjust the amplification of the image by pressing on switches 35, 36 in accordance, with an associated overlay icon displayed on the LCD 38, to increase or decrease the analog amplifier gain. The placement of the icon is to one side of the LCD 38 and is controlled with switches 35, 36. In this regard, each time the up arrow is depressed the analog amplifier gain would be increased in incremental steps (for example, in 3 dB steps) until a maximum value $G_{max}$ is reached (for example, a $G_{max}$ value cf 34.78 dB). The down arrow would decrease the analog amplifier gain by a similar value ( for example, a 3 dB step value) until the nominal gain setting $G_{min}$ is achieved (for example, where a $G_{min}$ of −3.3 dB is achieved).

It should be noted that the exact gain constants need to be determined by experimentation since performance varies from camera to camera due to differences between lens, CCD, and LCD components. It should further be noted that soft-key actuation relative to switches 35, 36 is also contemplated in order to implement other camera functions.

As will be explained hereinafter in greater detail, the camera 10 is adapted to permit a user to adjust the camera 10 to the liking of the user relative to the image displayed on the screen of the LCD 38. Depending on CCD characteristics, the maximum gain $G_{max}$ may or may not be 34.78 dB as a lower value may be selected since the user is able to adjust the gain level from the nominal gain level of $G_{min}$ to the maximum gain level $G_{max}$ in a "dial up" manner as will be explained hereinafter in greater detail.

Figures 2, 2A:
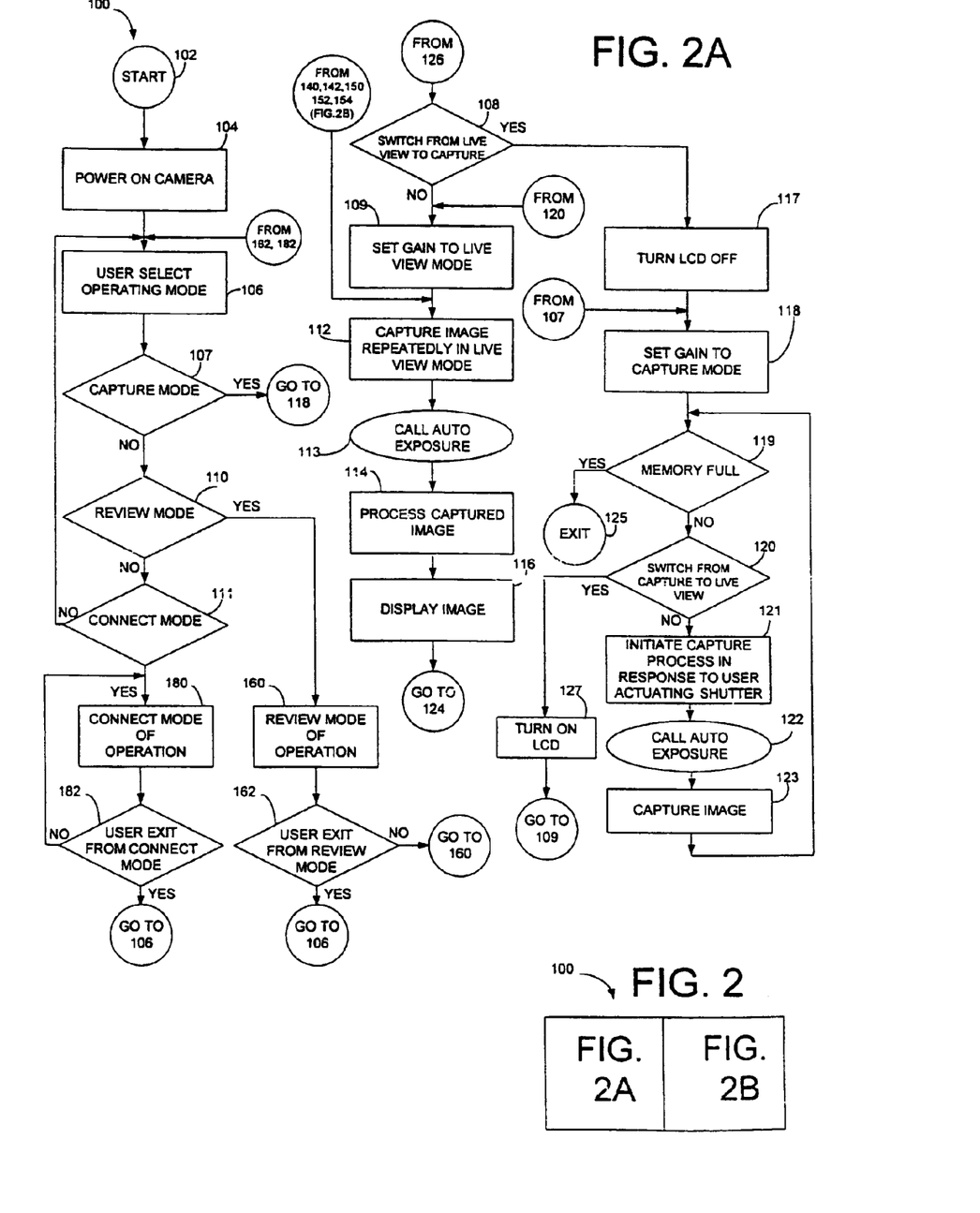
FIG. 2 is a high level flowchart illustrating a manual process of adjusting a displayed image.

Considering now the operation of the camera 10 in still greater detail with reference to FIG. 2, the camera begins operation when the user initiates a start operation by advancing from a start step 102 to a power on step 104. In this regard, the user actuates the power on switch 26.

Next the user selects a mode of operation at step 106 by actuating the mode selection switch 28 to select one of the operation modes of the camera 10. If the user selects a capture mode of operation, the camera advances from step 106 to set gain to capture mode step 118 via a determination step 107. In a similar manner if the user did not select the capture mode of operation but instead a review mode of operation, the camera advances from the determination step 107 to a review mode of operation step 160 via a determination step 110. Finally, if the user did not select the review mode of operation but instead a connect mode of operation, the camera proceeds from the determination step 110 to a connect mode of operation step 180 via a determination step 111. If the user ha s not actuated the mode selection switch, the camera returns to step 106 to wait for the user to make a selection.

Figure 2B:
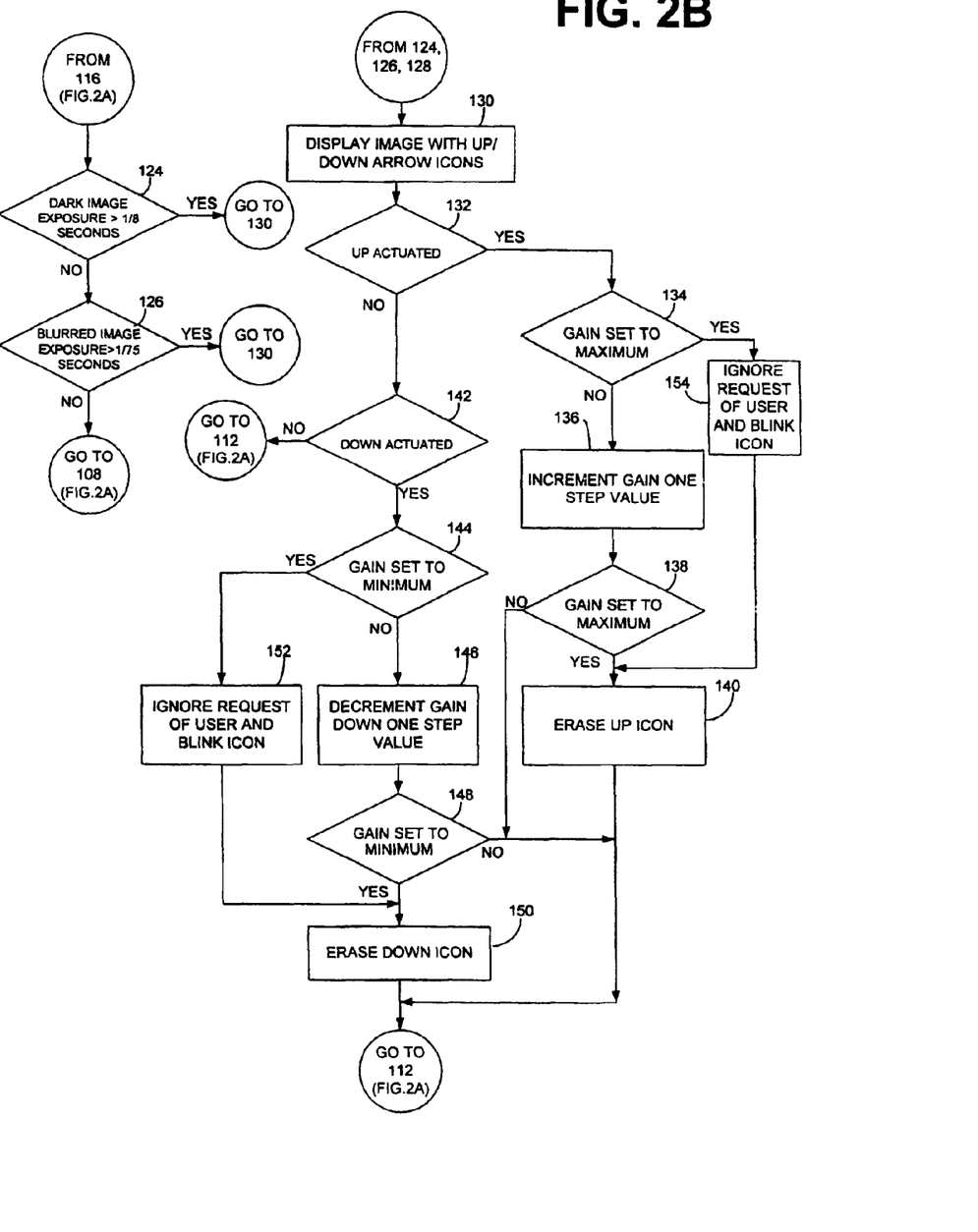

Considering now the capture mode of operation in greater detail with reference to FIGS. 2A and 2B, when the user selects the capture mode of operation, the microprocessor 25 causes the programmable amplifier 47 to be set to a capture mode gain value by advancing from step 107 to step 118. As mentioned earlier, the capture mode gain is a preset gain value that is a factory determined setting based upon image quality studies.

The camera 10 then goes to a determination step 119 to verify that the memory card 56 has a sufficient amount of u unused memory storage to receive another image. In this regard, if the memory card 56 is full and is no longer able to store additional images, the camera advances from the determination step 119 to an exit step 125. The exit step 125 also provides the user with a visual or sound indication that the storage capacity of the card 56 has been reached.

If the memory card 56 is not fill, the camera 10 proceeds from the determination step 119 to a determination step 120 to verify that the user has not switched the camera mode of operation from the still image capture mode to the live view capture mode. If the user has not switched to the live view mode, the camera 10 proceeds to a command step 121 to initiate a capture image process in response to each time a user actuates the shutter switch 34 as will be explained in greater detail.

When the user actuates the shutter switch 34, the camera 10 proceeds to a call auto exposure step 122 that causes an auto exposure algorithm 200 (FIG. 3) to be executed. The auto exposure algorithm 200 will be described hereinafter in greater detail.

Once the auto exposure algorithm 200 has been executed, the subroutine goes to a capture image command step 123 that causes the camera 10 to capture an image and store the image on the removable memory device flash memory card 56. The capture image command step 123 also causes the mechanical shutter 19 to close. The program then returns to step 119 and proceeds as described previously.

Considering now the operation of the live view capture mode of operation in greater detail with reference to FIGS. 2A and 2B, if at step 120 a determination is made that the user has actuated a live view mode selection switch 31 to select the live view mode of operation, the camera advances a command step 127 that causes the LCD 38 to be activated. The camera then proceeds to the command step 109 that causes the gain of the programmable amplifier 47 to be set to a nominal gain value anywhere between a $G_{min}$ value and a $G_{max}$ value and the multiply value of the digital multiplier 49 to be set to unity. The firmware then advances through a series of steps, where step 112 causes an image to be captured, step 113 calls the auto exposure subroutine 200, step 114 causes the image to be processed, step 116 causes the image to be displayed on the LCD 38.

From the display command 116, the subroutine advances to a decision step 124 to determine whether the exposure time of the CCD 15 is greater than one-eighth of a second which is indicative of a dark image condition. If the exposure time is greater than one-eighth of a second, the sub-routine goes to a command step 130 that causes an icon image to overlay the image displayed on the LCD 38. The icon image is indicative of an up arrow icon and a down arrow icon to prompt the user to actuate a boost/decrease gain switch 35 & 36 disposed on the switch control panel 17. In any event, after displaying the up/down arrow icons, at a decision step 130, the subroutine proceeds to a decision step 132 to make a determination whether the user actuated an increase gain request by actuation of the up switch 35.

Figure 4:
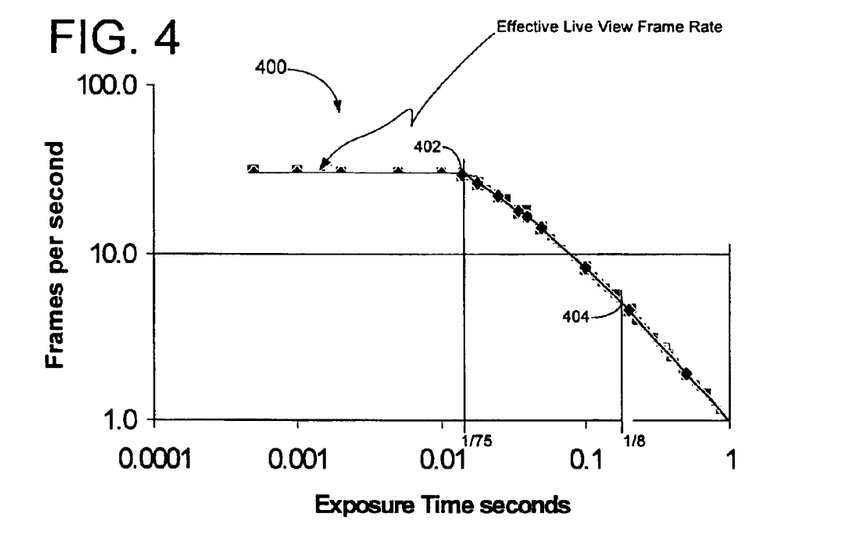
FIG. 4 is graphical representation of an effective frame rate during a live view mode of camera operation without adjustment.

If at the decision step 124 a determination was made that the exposure time of the CCD 15 was not greater than about one-eighth of a second, the subroutine proceeds to a determination step 126. At step 126 the subroutine determines whether the exposure time of the CCD 15 is greater than one seventy-fifth of a second which would be indicative of a blurred or smeared image situation as best seen at 404 (FIG.4). If the exposure time of the CCD 15 is not greater than about one seventy-fifth of a second, the subroutine proceeds to step 108 and continues as described previously. On the other hand, if the exposure time of the CCD is greater than about one seventy-fifth of a second, the subroutine advances to step 130 and continues as described previously.

Although in the preferred embodiment, a boost/decrease gain switch 35 & 36 respectively is illustrated, it should be understood by those skilled in the art, that other control arrangements can accomplish the same function. Thus for example, it is contemplated that the LCD 38 could include a touch screen 300 to permit a soft-key actuation. It is further contemplated that selection could be accomplished by voice recognition of increase gain or decrease gain or simply up or down. Therefore there is no intention of limiting the present invention to a hard key switch to affect increasing or decreasing the gain of the programmable amplifier 47 or the multiply factor of the digital multiplier 49.

Auto Exposure Algorithm

Before discussing the auto exposure algorithm in detail, it would be beneficial to briefly review the importance of an auto exposure feature in a camera. In this regard, to accommodate a wide range of lighting conditions, a typical camera has two major light control mechanisms. The first mechanism is contained within the lens system 13, 14, the aperture 18. The aperture constricts the amount of light reaching the light converting device, such as the CCD 15. The various constriction positions are commonly called f-stops or f-numbers. The numerically smaller the f-stop, the larger the amount of light that reaches the light converting device. The larger the f-stop number, the smaller amount of light.

Each f-stop is related by $\sqrt{2}=1.41421$ (ex f2.8 to f4 is a factor of $\sqrt{2}$). The maximum aperture (smallest numerical f-stop) for a lens offers no light loss. When the lens is at the minimum aperture, the amount of light, which reaches the light converting device, is a minimum. Typically, lenses will have multiple apertures to be able to capture images under a wide range of lighting conditions.

The second light control mechanism is exposure time. This is the amount of time that the light converting device is exposed to light. Exposure time is typically expressed in fractions of a second. The shorter the exposure time, the better the ability of the camera to stop subject motion. Generally, exposure times less than 1/90 sec are needed to have photographer hand hold pictures with good results (avoiding motion blur from the natural photographer hand shaking).

An algorithm that controls (selects) these two light adjustment mechanism is called auto exposure (AE). The purpose of such an algorithm is to adjust the aperture and exposure time in accordance with the photographed scene lighting conditions. It is desirable for a camera to capture pictures over a wide range of lighting conditions, from sunny beach to indoor at a party. The algorithm also determines when to activate a strobe light source to provide additional artificial lighting when needed.

Other factors that influence such an auto exposure algorithm are the fight sensitivity of the sensor and the gain setting. The higher the sensor sensitivity, the less light is needed to properly expose a picture. This could be translated into shorter exposure times or smaller apertures. This depends on how the auto exposure algorithm is set to function. For digital cameras, the gain actor acts very similar to increasing the sensor sensitivity. Increasing gain can be translated into a shorter exposure time or smaller aperture. As disclosed in the present specification there are two ways in which to implement a gain factor. First, the variable gain analogy amplifier 47 is added between the output of the CCD 15 and the input to the A/D converter 48. The gain is adjusted digitally by the micro-processor 25 presenting a digital word, which represents the desired gain value. The amplifier then uses analog amplification to modify the analog signal from the CCD 15.

The second way is to multiply the digital data after going through the A/D converter 48. The processor 25 or external digital multiplier 49 would multiply the binary integer number by another selected binary integer gain value to adjust the data to the desired level.

The auto exposure process is activated in one of two ways. First in the still image capture mode of operation the auto exposure algorithm is executed when the user aims the camera at an object scene and then depresses the shutter switch 34 to a half-way position. The camera then measures the amount of light that is being reflected from the object scene to be captured. Based upon this information, the algorithm computes, using the unique combination of aperture and exposure time to properly expose the scene.

The light may be out of range, however. This requires the algorithm to be performed repetitively. In this regard, the algorithm adjusts the settings to determine if the settings are within range. If the settings are within range, the camera are set to these settings and another light level is measured. This process is performed repeatedly until the final setting of aperture and exposure time is determined.

When the exposure time drops below 1/90 sec, the auto exposure algorithm will fire a strobe light (not shown) in order to provide additional light, provided the strobe function is enabled. When the user disables the strobe, the exposure times will extend down to two seconds. In this case, the camera should be mounted on a stationary object, like a tripod to avoid camera motion (this assumes that the subjects are not moving also).

Considering now the auto exposure algorithm relative to the preview/live view mode of operation, in order to be able to accurately frame a scene to be captured, to know what is and what is not in the frame, a preview/live view mode is implemented. The preview/live view mode is where an image is captured and displayed on the LCD. This process is rapidly repeated to form a "moving" image on the LCD. This "moving" image changes in response to the user aiming the camera at different portions of a desired object. Thus, live view is similar to a video image capture without image storage. However, the preview images are for the user to merely view the object and not to store the object.

In the live view mode, to capture a frame the following process is generated:

$T_a$=Time to open the mechanical shutter
$T_b$=Time to set aperture, focus and gain
$T_c$=$T_{ocd}$=exposure time of CCD
$T_d$=Time to unload CCD data
$T_e$=Time to reset CCD
$T_f$=Time to process image
$T_g$=Time to display image on LCD General Process:

The mechanical shutter 19 is opened during the time period $T_a$ to expose the CCD 15 to fight. Auto exposure/auto focus information settings are set mechanically by the lens arrangement 13 operating under the control of the micro-processor 25 during time $T_b$. The CCD15 is then exposed during time $T_c$. Data is off loaded from the CCD 15 during time $T_e$, into the micro-processor 25 via the analog to digital converter 48. The image is processed by the micro-processor 25 and auto exposure values are calculated from the resulting image statistics during the time period $T_f$. The image is then ready for display on the LCD 38 at time period $T_g$. Due to mismatched resolutions between the CCD15 and the LCD 38, the resolution of the CCD data must be reduced for display on the LCD 38. When the data is ready for display the process can the be repeated starting from $T_b$.

Considering now the rive view frame rate, the frame rate is defined as the number of individual frames displayed to the LCD per second. This is determined by how long it takes the micro-processor 25 to process the image, scene exposure time, how fast the LCD 38 can be updated and how smooth thee image is perceived by the user. Typically, thirty frames per second (fps) is considered by users as motion quality (TV for example), and thus, most, if not all manufacturers produced LCD units to accept a thirty fps transfer rate. Certain systems put an artificial upper limit on the LCD frame rate due to component limitations; and thus, the only other variable factors in determine a maximum frame rate are CCD exposure time and micro-processor overhead time.

If all the variables other than the exposure time are considered to be system overhead constants, the sum of these variables are expressed as a constant value K, and then the frame rate per second is expressed as follows:

$$\text{Frame rate (fps)} = 1/(T_{ccd}+K) \quad \quad \text{Equation 1.}$$

FIG. 4 is a graph of equation 1 or an effective frame rate using a constant K value of 20 milliseconds.

It is possible to increase the frame rate by skipping frames that the AE information is processed within. By calculating these parameters twice to four times a second, instead of each frame, reduces the processing overhead and helps to increase the frame rate.

As the exposure time increases beyond about 13 ms (1/75 sec), the frame rate must reduce. The exposure time of the CCD 15 is beginning to dominate the amount of total time for the frame. When the frame rate lowers, there are two major affects that are visible to the user. First, when the exposure time lengthens to approximately 1/15 sec or greater and if the camera is moving relative to the subject, the resulting image will appear to smear as the camera pans across a scene. This is because of the relative motion and long exposure time. If no relative motion was to occur, then the image will be easily recognizable. Once the light continues to diminish, the second artifact of the system occurs, that is a dark or no image. This occurs when there is not enough light to expose the CCD 15. In the still image capture mode, the strobe would have been fired to illuminate the scene. In live view mode, there is no equivalent to the strobe in capture mode.

For both of these cases, the aperture is maximized, at the largest setting and the exposure time is the only variable to adjust to account for the low light conditions.

The gain factor, as will be explained hereinafter in greater detail is utilized to reduce LCD image smearing, reduction in frame rate and dark images.

Figure 3:
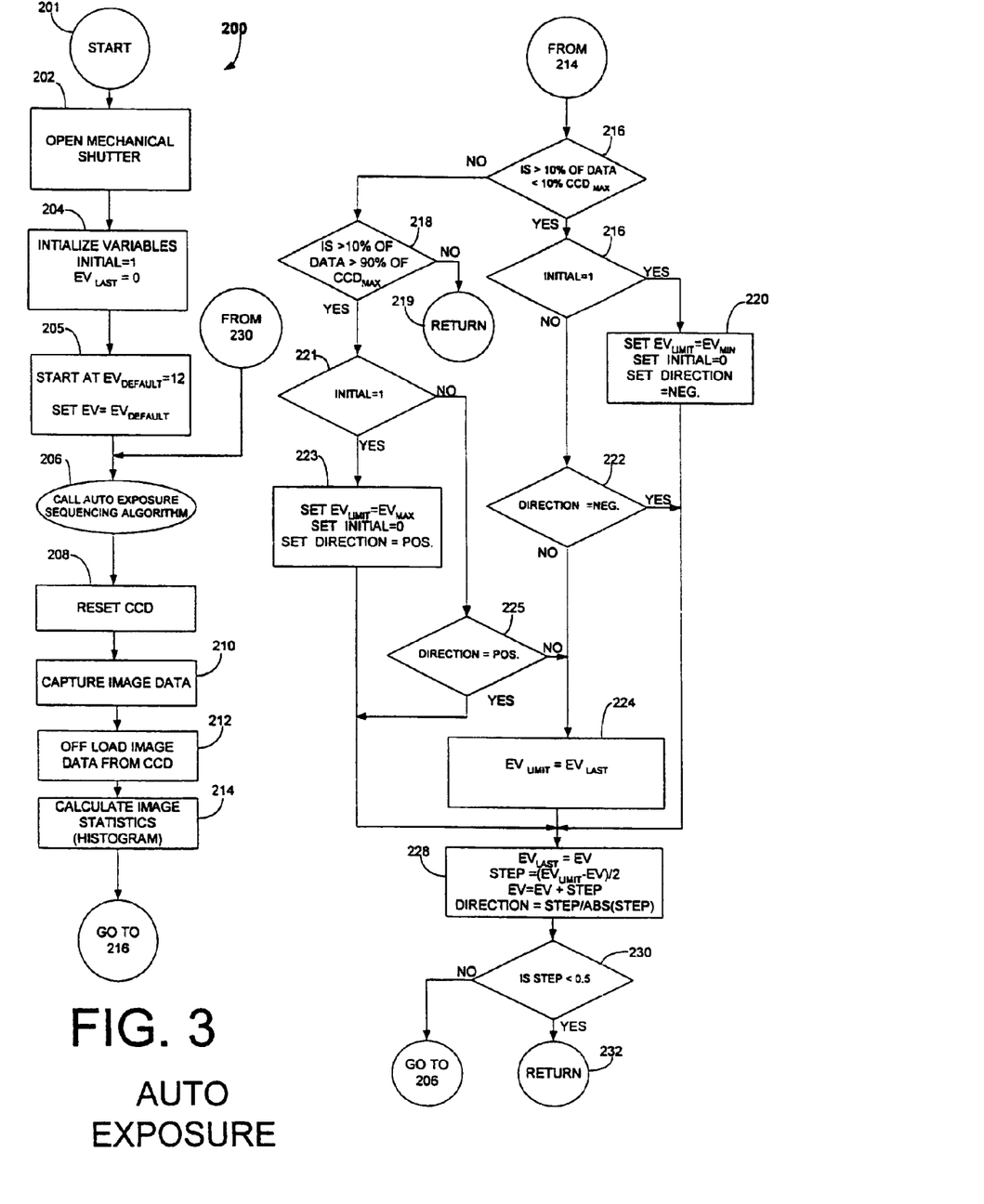
FIG. 3 is high level flowchart of an auto exposure algorithm.
Figure 5:
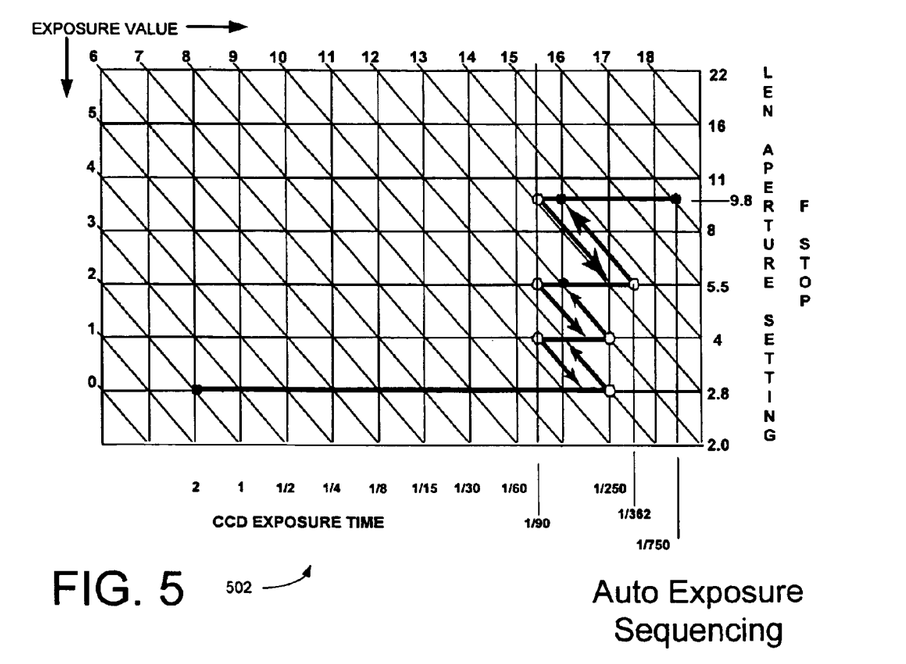
FIG. 5 is graphical representation of auto exposure sequencing.

Considering now the auto exposure subroutine 200 in greater detail with reference to FIGS. 3 and 5, the auto exposure subroutine 200 is initiated by the call commands 113 and 121 for the live view capture mode and the still view capture mode of operations. In this regard, the camera goes to a start command 201 to a open mechanical shutter command 202 that allows light to be converted by the CCD 15.

The subroutine then proceeds to an initialize command 204 that initializes the variables utilized by the auto exposure subroutine. In this regard, an initialize flag INITIAL is set to a logical one that is indicative of a first pass through the algorithm, and $EV_{Last}$ is set to zero. The subroutine then advances to a set exposure command 205 that causes the exposure value to be set to the default value, that is about $EV=EV_{Default}=12$ (which assumes an initial daylight environment or lighting condition).

Next the subroutine advances to a call command 206 that causes an auto exposure sequencing algorithm 600 (FIG. 6) to be called to select the corresponding exposure time and aperture for the EV value. After the algorithm 600 is executed, the program returns to the auto exposure algorithm at a reset command 208. The reset command 208 causes the CCD 15 to be reset allowing new image data to be captured at a capture image data step 210. Once the image data has been captured by the CCD at the selected lens aperture and exposure time, the captured image data is off 15 loaded from the CCD 15 to the microprocessor 25 via an off load command step 212.

The subroutine then proceeds to a calculate command 214 that uses the off loaded captured image data and causes the microprocessor 25 to calculate image statistics (histogram). The micro-processor 25 then performs a series of determination steps to determine whether the exposure time for the CCD 15 needs to be increased or decreased based upon the histogram. In this regard, the camera advances from the calculate step 214 to a determination step 216 to determine whether greater than 10% of the captured data is less than 10% of the CCD saturation level. If this determination is verified, the subroutine advances to a determination step 216 to determine if the initialize flag INITIAL is set to a logical one which is indicative that this is the first pass through the algorithm. If this condition is true, the program goes to an setup command 220 that reset the INITIAL flag to a logical zero, set a DIRECTION flag to a negative direction which is indicative that the exposure value needs to be decreased (longer exposure time/larger aperture). The subroutine then advances to a command step 228 that will be described hereinafter in greater detail.

If at the determination step 216 it is determined that the INITIAL flag is not equal to a logical one, the program proceeds to a determination step 222. At determination step 222 a determination is made on the DIRECTION flag to determine whether the DIRECTION flag is set to a negative one. If this condition is true, the program goes to the command step 228 which will be described hereinafter in greater detail. Otherwise, the subroutine goes to a command step 224. The command step 224 causes the limit value of the exposure time EV to be set to $EV_{LAST}$. The subroutine then proceeds to a command step 228.

The command step 228 sets $EV_{LAST}$ to EV and STEP to $(EV_{LIMIT}-EV)$ divided by two. The exposure value is then EV=EV+STEP, and the DIRECTION is determined to be equal to STEP divided by the absolute value of STEP. In this regard, the exposure value will be increased by half the value from the current setting to the limit value.

Next a determination step 230 is executed to determine whether STEP is less than 0.5EV which is indicative that the actual exposure is within plus or minus 0.5 EV. If this condition is not true, the subroutine goes to step 206 and iterates to get closer to the correct exposure value. Otherwise the subroutine proceeds to a return command 232 that returns the program to the main control algorithm, that is the camera exits the auto exposure routine 200 and returns to either step 114 if the call command that caused the execution of the subroutine 200 was call step 113, or the command step 123 if the call command that caused the execution of the subroutine 200 was call step 122.

If the determination at step 216 is not verified, the camera advances from the determination step 216 to a determination step 218 to determine whether 10% of the captured image data is >90% of $CCD_{MAX}$ (over exposure condition exists). If this determination is negative, the camera returns the program to the main control algorithm, that is the camera exits the auto exposure routine 200 and returns to either step 114 if the call command that caused the execution of the subroutine 200 was call step 113, or the command step 123 if the call command that caused the execution of the subroutine 200 was call step 122. Otherwise the program goes to determination command to determine whether the INITIAL flag is set to a logical one.

INITIAL is set to a logical one the subroutine advances to a command step 223 that set the limit exposure value $EVE_{LIMIT}$ to a maximum exposure value $EVE_{MAX}$, that resets the INITIAL flag to zero, and sets the DIRECTION flag to a positive direction. The program then advances to the command step 228 and proceeds as described previously.

Considering now if the user initiates an up actuation of switch 31, which is indicative of the displayed image being dark, the camera 10 proceeds to a decision step 134 to determine whether the gain of the programmable amplifier 47 is set to $G_{max}$. If the programmable amplifier is set to $G_{max}$, the image cannot be further corrected. In this regard, the camera advances to an ignore request step 154 that causes the displayed icons to blink to provide the user with an indication that the image may not be further corrected. In other words, the ambient lighting conditions are so low, that the camera will be incapable of displaying an acceptable image. After command 140 is executed the program advances to a command step 140 that will be described hereinafter in greater detail.

If the programmable amplifier 47 is not set to $G_{max}$ the camera advances to an increment gain by one step value step 136. The camera firmware then proceeds to a determination step 138 to determine whether the boosting of the gain of the programmable amplifier 47 by one incremental value step was sufficient to set the gain to $G_{max}$. If the programmable amplifier is set to $G_{max}$, the camera proceeds to an erase step 140 that causes the displayed up arrow icon to be erased or no longer displayed. This then provides the user with an alternative indication that the gain has been set to $G_{max}$ and that no further image adjustment is possible.

The firmware of the camera 10 then returns to the step 112 where the camera 10 causes another image to be captured. In this regard, it should be understood by those skilled in the art, that the camera 10 operates in a series of repeated steps of capturing, processing and displaying the image as seen through the lens arrangement 13. This buffered capture mode continues repeatedly until the user switches to the point and shoot capture mode.

Considering now step 132 once again with reference to FIG. 2B, if the user has not actuated boost gain, the firmware determines whether the user has initiated a decrease gain via the actuation of switch 31. In this regard, the camera firmware returns to step 112 (FIG. 2A) and proceeds as described previously until the user actuates switch 31.

If a determination is made that the user initiated a decrease actuation of switch 36, the camera 10 proceeds to a determination step 144 to determine whether the gain of the programmable amplifier has been set to $G_{min}$. If so, the firmware of camera 10 ignores the request of the user, but causes the displayed icons to blink to provide the user with an indication that the image may not be further corrected by decreasing the gain by executing a command step 152. After executing the ignore command 152 the program proceeds to an erase step 150 that will be described hereinafter in greater detail.

If a determination is made at decision step 144 that the gain is not set to $G_{min}$ the firmware advances to a decrease gain step 146 that causes the gain of the programmable amplifier 47 to be decreased by one incremental value. The camera firmware then proceeds to a determination step to verify whether the gain of programmable amplifier 47 is now set to $G_{min}$. If so, the firmware goes to the erase step 150 that causes the displayed down arrow icon to no longer be displayed. If the programmable amplifier 47 gain is not set to $G_{min}$ the firmware returns to step 112 and proceeds as described previously.

Considering now the review mode of operation relative to step 110 (FIG. 2A), if the user has selected the review mode of operation, the firmware proceeds to a review mode of operation step 160. The camera remains in the review mode operation, until the user exits from the review mode. In this regard, a denomination step 162 is performed by the firmware to verify when the user exits causing the firmware to return to step 106 where the firmware proceeds as described previously.

Considering now the connect mode of operation relative to step 111 (FIG. 2A), if the user has selected the connect mode of operation, the firmware proceeds to a connect mode of operation step 180 (FIG. 2A). The camera remains in the connect mode operation, until the user exits from the connect mode. In this regard, a determination step 182 is performed by the firmware to verify when the user exits causing the firmware to return to step 106 where the firmware proceeds as described previously.

Considering now the digital camera 10 in still greater detail with reference to FIG. 1, a stepper motor 29 coupled between the microprocessor 25 and the primary and secondary lens systems 14 and 44 respectively, cause the respective lens systems 14 and 44 to be moved for focusing and zooming purposes. The stepper motor 29 under the control of the microprocessor 25 and a fixed focus control algorithm-adjusts, for a given aperture setting the primary lens system 14 to a predetermined focal point setting when the camera 10 is operating in the fixed focus mode of operation.

The stepper motor 29 under the control of the microprocessor 25 and the zoom control algorithm also zooms the primary lens system 14 and the secondary lens system 44 over an optical zoom range between 1×magnification and 2×magnification. At the end of the optical zoom range, when the primary lens system 14 can no longer affect any greater zooming effects, the microprocessor 25 causes the stepper motor 29 to continue to move the secondary lens system 44 in such a manner as to simulate digital zooming effects that are directly viewable by the user without activating the LCD unit 38. That is, the secondary lens system 44 will continue to magnify the object scene as viewed in the viewfinder 43, even though the primary lens system 14 is no longer moving. In short then, the amount of magnification the optical-viewfinder 43 will show is the product of the optical and digital zoom factors.

Figure 6:
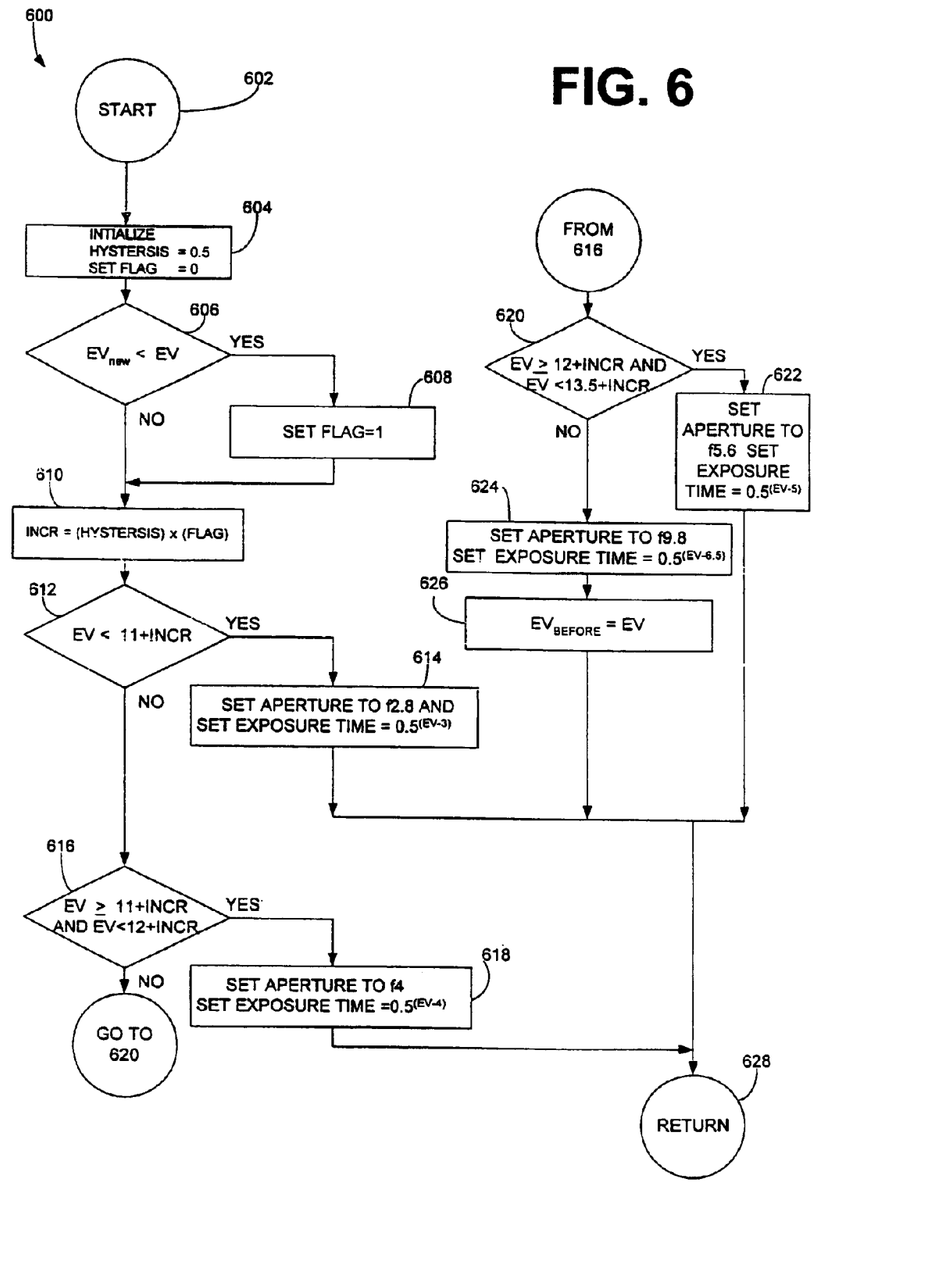
FIG. 6 is a flow chart of the auto exposure sequencing algorithm.

Considering now the auto exposure sequencing algorithm 600 in greater detail with reference to FIG. 6, the auto exposure algorithm 600 begins at a start command 602 whenever a call auto exposure command is executed (see FIG.2A). The algorithm 600 set the aperture and exposure time in accordance with a measure EV value. In this regard, after executing the start command 602, the program proceeds to an initialize command that causes a hystersis direction flag to be reset to a zero value and an exposure hystersis value of the camera 10 to be set to about 0.5 EV (see FIG. 5) to minimize the auto exposure sequencing process oscillations. The hystersis direction flag is set to zero when increasing the exposure index (EV) and to a negative one when decreasing the exposure index.

Next, the program proceeds to a determination step 606 to determine when the new exposure value is less than the previous exposure value ($EV_{BEFORE}$). If so, the program goes to a set command 608 that causes a hystersis feature to be enabled by setting a hystersis direction flag. From the set command 608, the program advances to an increment command 610 that will be described hereinafter in greater detail.

If a determination is made at the determination step 606 that she new exposure value is not less than the actual exposure value, the program advances directly to the increment step 610. That is, if the new exposure value is greater than the previous exposure value, no hystersis feature is needed. Step 610 calculates the hystersis value.

From the increment step 610, the program goes to a determination step 612 to determine if the exposure value of the camera is less than 11 plus the incremental step value. If so, the algorithm causes the aperture of the camera to be set to f2.8 and the exposure time to $0.5^{(EV-3)}$ seconds. After setting the aperture and exposure time, the algorithm returns to step 626 from the call step (FIG. 5) and proceeds as described previously.

Alternatively, if the exposure value of the camera is not less than 11 plus the incremental step value, the algorithm proceeds to another determination step 616. At step 616 the exposure value is examined to determine whether the value is at least equal to 11 plus the incremental value and less than 12.5 plus the incremental value.

If a determination is made as noted, the algorithm proceeds to a set command 618 that sets the aperture to f4 and the exposure time to $0.5^{(EV-4)}$ seconds. After the exposure time and aperture have been set the algorithm proceeds to the return command 618 and continues as described previously. Alternatively, if the exposure values are not at least equal 11 plus the incremental step value and less than 12 plus the incremental value, the program goes to a determination step 620.

At the determination command 620 the exposure value is examined to determine whether if is at least equal to 12 plus the incremental value and less than 13.5 plus the incremental value.

If this condition is true, the program advances to a set command 622 that causes the aperture of the camera to be set to f5.6 and the exposure time to $0.5^{(EV-5)}$ seconds. The program then proceeds to the return command 618 and continues as described previously. Otherwise, the algorithm goes to a set command 624 that causes the aperture of the camera to be set to f9.8 and the exposure time to $0.5^{(EV-6.5)}$ seconds.

After executing the command 624, the program then proceeds to a set command 626 that stores the value of EV in $EV_{BEFORE}$. Then algorithm then advances to the return command 618 and proceeds as described previously.

While particular embodiments of the present invention have been disclosed, it is to be understood that various different modifications are possible and are contemplated within the true spirit and scope of the appended claims. For example, throughout the specification reference has been made to a digital camera However, it is contemplated that any electronic device having a display device that displays a buffered image captured at a fixed frame rate would benefit from the disclosed invention. There is no intention, therefore, of limitations to the exact abstract or disclosure herein presented.

We claim:

1. An electronic device for displaying a buffered image, comprising:

an image capture device having a range of exposure times for converting light to an electrical signal; and a programmable amplifier coupled to said image capture device and responsive to a manual indication from a user that the image is sufficiently obfuscated due to lighting conditions to lack discernible features for adjusting the strength of said electrical signal;

wherein a set of controls icons are automatically displayed whenever the exposure time of said image capture device is at about 13.33 milliseconds or greater to help facilitate user adjustments to improve quality.

2. An electronic device for displaying a buffered image according to claim 1, wherein said programmable amplifier is further responsive to said manual indication from the user that the image is smeared for further adjusting the strength of said electrical signal to cause the display of an unsmeared image.

3. An electronic device for displaying a buffered image, according to claim 1, further comprising:

multiplying means responsive to said programmable amplifier for further increasing the strength of said electrical signal to cause the display of an image of sufficient detail to facilitate live view observation.

4. An electronic device for displaying a buffered image, according to claim 3, wherein said multiplying means includes:

an analog to digital converter for converting said electrical signal into a digital signal; and digital multiplier means for increasing the strength of said digital signal.

5. An electronic device for displaying a buffered image according to claim 4, wherein said digital multiplier means is a digital multiplier.

6. An electronic device for displaying a buffered image according to claim 4, wherein said digital multiplier means is a microprocessor.

* * * * *

UNITED STATES PATENT AND TRADEMARK OFFICE
CERTIFICATE OF CORRECTION

PATENT NO. : 6,900,840 B1
APPLICATION NO. : 09/661764
DATED : May 31, 2005
INVENTOR(S) : Charles Schinner et al.

It is certified that error appears in the above-identified patent and that said Letters Patent is hereby corrected as shown below:

On the title page, item (56), under "U.S. Patent Documents", column 2, line 1, below "6,603,508 B1 *   8/2003       Hata           348/229.1"
insert -- 6,167,469 *      12/2000    Safai, et al.       710/62
          5,610,654 *      3/1997     Parulski, et al.    348/229.1
          5,311,245 *      5/1994     Nakai, et al.       396/238
          5,008,757 *      4/1991     Kimura, et al.      348/229.1
          4,780,766 *      10/1988    Nutting             348/229.1
          2001/0015760 *   8/2001     Fellegara, et al.   348/333.01 --.

On the title page, item (57), under "Abstract", in column 2, line 13, delete "tie" and insert -- the --, therefor.

In column 1, line 7, after "Digital" insert -- Camera and --.

In column 6, line 36, delete "cf" and insert -- of --, therefor.

In column 7, line 19, after "of" delete "u".

In column 7, line 26, delete "fill" and insert -- full --, therefor.

In column 9, line 8, delete "fight" and insert -- light --, therefor.

In column 9, line 13, delete "actor" and insert -- factor --, therefor.

In column 10, line 3, delete "$T_{ocd}$" and insert -- $T_{ccd}$ --, therefor.

In column 10, line 11, delete "fight" and insert -- light --, therefor.

In column 10, line 25, delete "rive" and insert -- live --, therefor.

In column 10, line 30, delete "thee" and insert -- the --, therefor.

In column 10, line 36, delete "determine" and insert -- determining --, therefor.

In column 11, line 31, after "CCD" insert -- 15 --.

In column 11, line 32, after "off" delete "15".

UNITED STATES PATENT AND TRADEMARK OFFICE
CERTIFICATE OF CORRECTION

PATENT NO. : 6,900,840 B1
APPLICATION NO. : 09/661764
DATED : May 31, 2005
INVENTOR(S) : Charles Schinner et al.

It is certified that error appears in the above-identified patent and that said Letters Patent is hereby corrected as shown below:

In column 12, line 29, insert -- If -- before "INITIAL".

In column 13, line 34, delete "denomination" and insert -- determination --, therefor.

In column 14, line 28, delete "she" and insert -- the --, therefor.

In column 15, line 26, in Claim 1, delete "controls" and insert -- control --, therefor.

In column 15, line 29, in Claim 1, after "improve" insert -- image --.

Signed and Sealed this

First Day of September, 2009

David J. Kappos
*Director of the United States Patent and Trademark Office*